United States Patent
Adam et al.

(10) Patent No.: US 7,664,609 B2
(45) Date of Patent: Feb. 16, 2010

(54) DEVICE FOR IMPACT SENSING HAVING AT LEAST TWO PRESSURE SENSORS

(75) Inventors: Boris Adam, Gäufelden (DE); Christian Ohl, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/524,217

(22) PCT Filed: Feb. 24, 2003

(86) PCT No.: PCT/DE03/00562

§ 371 (c)(1),
(2), (4) Date: Sep. 14, 2005

(87) PCT Pub. No.: WO2004/018263

PCT Pub. Date: Mar. 4, 2004

(65) Prior Publication Data

US 2006/0155504 A1 Jul. 13, 2006

(30) Foreign Application Priority Data

Aug. 14, 2002 (DE) ................. 102 37 160

(51) Int. Cl.
*G01L 27/00* (2006.01)
*G01L 7/00* (2006.01)
*G01L 15/00* (2006.01)
*B60R 21/16* (2006.01)

(52) U.S. Cl. .......... 702/47; 340/436; 340/933; 280/734; 280/735; 702/98; 702/138

(58) Field of Classification Search .......... 702/47
See application file for complete search history.

(56) References Cited

U.S. PATENT DOCUMENTS

| 5,231,597 A * | 7/1993 | Komatsu ............. 702/148 |
| 5,748,075 A * | 5/1998 | Dirmeyer et al. ......... 340/436 |
| 6,209,908 B1 * | 4/2001 | Zumpano ............. 280/729 |
| 6,212,456 B1 * | 4/2001 | Stride .............. 701/45 |
| 6,269,903 B1 * | 8/2001 | Bohner et al. ............ 180/406 |
| 6,302,545 B1 * | 10/2001 | Schofield et al. .......... 359/601 |
| 6,328,126 B2 * | 12/2001 | Breed et al. ............ 180/274 |
| 6,338,010 B1 * | 1/2002 | Sparks et al. ........... 701/1 |
| 6,513,829 B1 * | 2/2003 | Zumpano ............. 280/730.1 |
| 2002/0166710 A1 * | 11/2002 | Breed ............. 180/282 |
| 2003/0045781 A1 * | 3/2003 | Rosenheimer ........... 600/300 |
| 2003/0051530 A1 * | 3/2003 | Eisele et al. ........... 73/12.09 |
| 2003/0140679 A1 * | 7/2003 | Roelleke et al. ............ 73/12.01 |

FOREIGN PATENT DOCUMENTS

| DE | 36 37 165 | 5/1988 |
| DE | 101 12 194 | 3/2002 |

* cited by examiner

*Primary Examiner*—Eliseo Ramos Feliciano
*Assistant Examiner*—Janet L Suglo
(74) *Attorney, Agent, or Firm*—Kenyon & Kenyon LLP

(57) ABSTRACT

A device for impact sensing having at least two pressure sensors is described, where pressure values are communicated from the pressure sensors to a processor, and the processor performs impact sensing on the basis of the pressure value. The processor communicates the pressure values to additional vehicle systems, which use them to fulfill their own functions, or at least to carry out a plausibility check of their own pressure values.

6 Claims, 1 Drawing Sheet

DEVICE FOR IMPACT SENSING HAVING AT LEAST TWO PRESSURE SENSORS

FIELD OF THE INVENTION

The present invention relates to a device for impact sensing having at least two pressure sensors.

BACKGROUND INFORMATION

German Patent Application No. DE 102 101 31.0 (not a prior publication) describes communicating absolute pressure values as well as differential pressure values.

SUMMARY

An example device according to the present invention for impact sensing having at least two pressure sensors may have the advantage over the related art that the pressure values of the pressure sensors of the example device according to the present invention may now also be made available to other vehicle systems. To that end, the example device according to the present invention is connected to those other vehicle systems, for example, through a bus, in order to communicate the pressure values to those vehicle systems also. The other vehicle systems may use these pressure values to check the plausibility of their own sensor values and/or as a substitute for a nonexistent sensor. This enables inexpensive multiple use of the pressure signals of the pressure sensors for impact detection. The additional hardware complexity is small, since in most cases an interface or a bus system to other vehicle systems is already present. The result is that pressure sensors may be eliminated for the other vehicle systems. This may also simplify the design of the electronic systems in a vehicle.

It is particularly advantageous if the at least one additional vehicle system is an injection system, a climate-control system and/or a barometer function. An altitude-measuring system based on pressure may also profit from the example device according to the present invention.

The pressure value may be communicated advantageously to the other vehicle systems as an absolute pressure value or as a differential pressure value.

BRIEF DESCRIPTION OF THE DRAWINGS

Exemplary embodiments of the present invention are illustrated in the figures and are explained in greater detail below.

DETAILED DESCRIPTION OF EXAMPLE EMBODIMENTS

Pressure sensors are known from industry and from automotive applications. Depending on the design, the pressure sensors communicate absolute or differential pressure values to an analyzer unit. In the automobile, the sensors are usually utilized for controlling the engine and for sensing side crashes and triggering an airbag.

According to the example embodiment of the present invention, the pressure values which are constantly being recorded and communicated to the control unit by the sensors present for impact sensing are also made available to other vehicle systems. This may make it possible under some circumstances to eliminate pressure sensors or to check pressure sensors for plausibility which are present in other vehicle systems.

Figure 1:
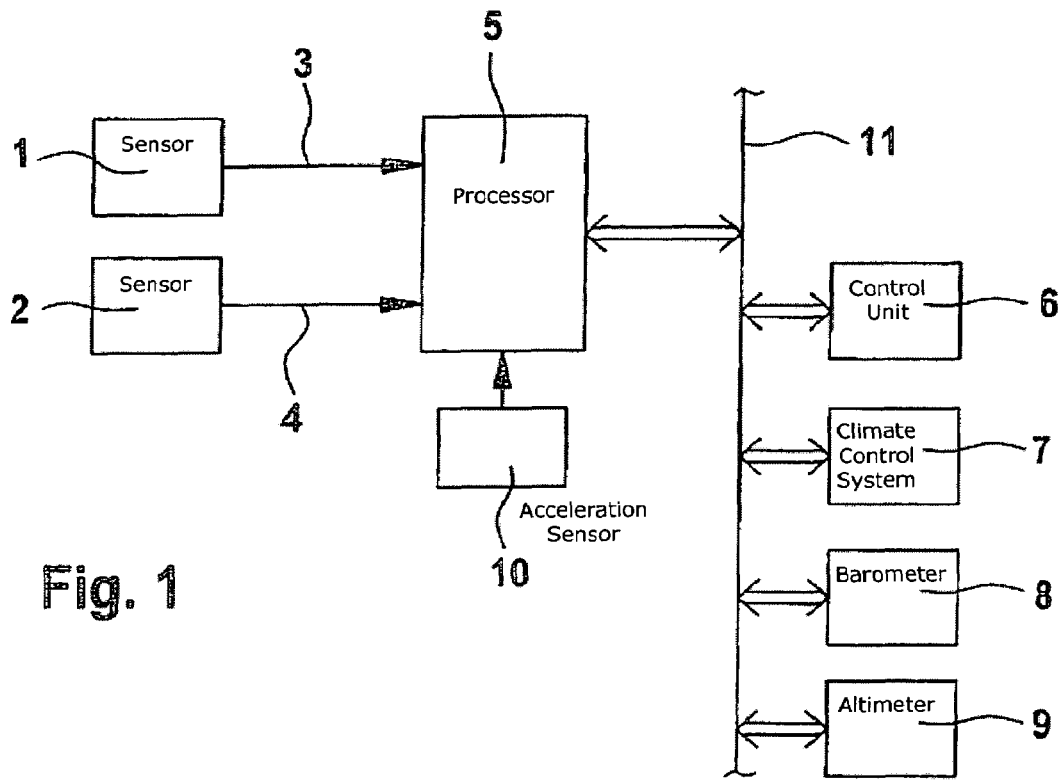
FIG. 1 shows a block diagram of an example device according to the present invention.

FIG. 1 shows a block diagram of the example device according to the present invention. Two pressure sensors 1 and 2, which are used for impact sensing, are connected via corresponding lines 3 and 4 to a processor 5. Through a third data input, processor 5 receives signals from an acceleration sensor 10, which is used to check the plausibility of the pressure sensor signals from sensors 1 and 2. Through a data input/output, processor 5 is connected to a bus 11, to which additional vehicle systems 6 through 9 are connected. Vehicle system 6 is an injection system, vehicle system 7 is a climate-control system, vehicle system 8 is a barometer function having an on-board computer, and vehicle system 9 is an altimeter.

Pressure sensors 1 and 2 are designed as micromechanical pressure sensors, which are used here for sensing side impacts and are thus located in a side part of the vehicle. The side part is largely closed, so that when a side impact occurs, pressure sensors 1 and 2 detect an adiabatic pressure increase through the deformation of the side part. That makes it possible for pressure sensors 1 and 2 to sense a side impact very quickly. Pressure sensors 1 and 2 therefore function as indirect deformation sensors.

Alternatively or additionally, it is also possible to utilize pressure sensors in the bumper or the rear, in order to also detect an impact there through an adiabatic pressure increase. More than two sensors may be used for side impact sensing. However, the use of at least two sensors makes it possible to ensure a reciprocal check of the performance of pressure sensors 1 and 2 through the evaluation of the signals that are communicated to the processor via lines 3 and 4. Because pressure sensors 1 and 2 are located in the side parts, which are opposite each other, they are positioned in the vehicle away from a control unit. Sensors 1 and 2 have measuring amplifiers, an analog-digital converter and a transmitting element, in order to communicate the measured pressure data to processor 5. Here, unidirectional communication is provided from sensors 1 and 2 to processor 5 in a control unit. Lines 3 and 4 are also used to supply power to pressure sensors 1 and 2, the pressure sensors communicating their data to processor 5 over this direct current through amplitude modulation. Processor 5 has one receiving module each for lines 3 and 4, in order to receive the transmitted data. Alternatively, it is possible for the connection between pressure sensors 1 and 2 and processor or control unit 3 to be bidirectional, so that control unit 5 is also able to communicate queries to pressure sensors 1 and 2. It is further possible for pressure sensors 1 and 2 to communicate not only their measurement data to control unit 5 or the processor, but also data that have already been analyzed, for example differential pressure data or normalized data. In addition, it is possible for the connection between pressure sensors 1 and 2 and control unit 5 to be implemented via a bus, i.e., a sensor bus. This would enable control unit 5 to use only a single bus controller, and also only a single line to which sensors 1 and 2 are connected. Acceleration sensor 10 is provided here as a plausibility sensor for an impact. This means that only if acceleration sensor 10 also indicates an impact does processor 5 decide that an impact has occurred, and activates restraining means such as airbags and belt tensioners, which are not shown here. However, if no impact has occurred, control unit 5 communicates the pressure data of the two sensors 1 and 2 to the other control units 6 through 9. These use the pressure data to check the plausibility of their own sensors or to carry out their function with this pressure data. In particular, comfort functions such climate-control system 7, barometer function 8 and altimeter 9 may dispense with pressure sensors of their own and use the values from pressure sensors 1 and 2.

From the point of view of functions alone, it is possible to dispense with the additional sensor 10 used here for plausibility checking, if it is possible to tolerate impairment of the functions of the other vehicle systems 6-9, designed mostly for comfort, in the event of a crash, or if this impairment is slight.

It is also possible for control unit 5 to be connected to vehicle systems 6, 7, 8 and 9 via two wire connections each. A wireless or optical connection is also feasible here.

Figure 2:
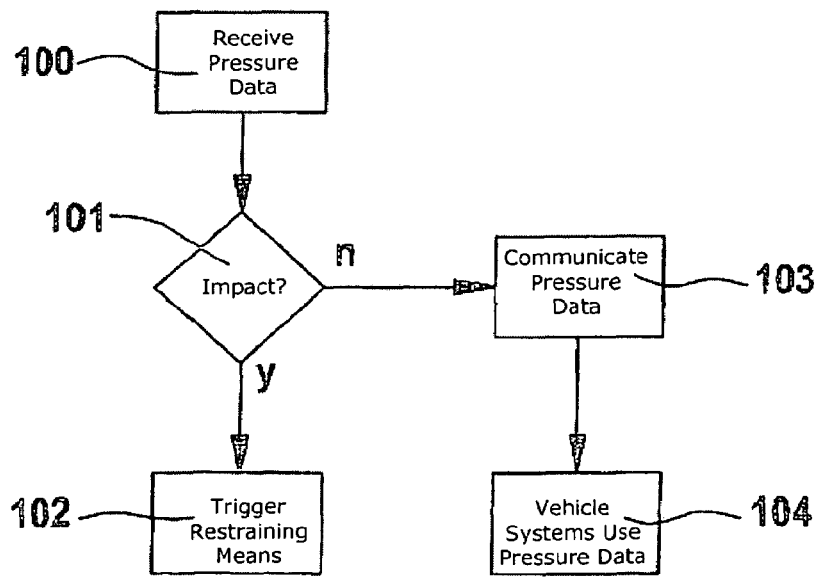
FIG. 2 shows a flow chart of the sequence of operations on the example device according to the present invention.

FIG. 2 shows a flow chart to explain the sequence of operations on processor 5. In process step 100, processor 5 receives the pressure data from sensors 1 and 2. In process step 101, processor 5 uses the signal from acceleration sensor 10 to check whether an impact has occurred. If both the pressure data and the acceleration data indicate a side impact, then the system jumps to process step 102, and restraining means corresponding to the severity of the impact are triggered. But if no impact was detected in process step 101, which is the normal case, then the system jumps to process step 103, and the pressure data from sensors 1 and 2 is communicated to vehicle components 6 through 9. In process step 104, vehicle systems 6 through 9 then carry out their functions with the pressure data. Thus, it is advantageously possible for vehicle systems 6 through 9 to perform plausibility checks of their own measured values, or to use these pressure values directly for their own functions.

What is claimed is:

1. A device for impact sensing, comprising:
   a processor; and
   at least two pressure sensors each detecting an impact to a vehicle based on adiabatic pressure increase, wherein the at least two pressure sensors are connectable to the processor to communicate at least one pressure value each to the processor, the processor being configured to perform an impact sensing based on the at least one pressure value;
   wherein the processor is connectable to at least one restraining system; and
   wherein the processor is connected to at least one vehicle system, besides said at least two pressure sensors, besides said at least one restraining system, and besides any other system for restraining an occupant of the vehicle, to transmit the at least one pressure value to the at least one vehicle system.

2. The device as recited in claim 1, wherein the at least one vehicle system is at least one of an injection system, a climate-control system, a barometer function, and an altitude measuring function.

3. The device as recited in claim 1, wherein the at least one vehicle system is configured to use the at least one pressure value for plausibility checking.

4. The device as recited in claim 1, wherein the at least one vehicle system is configured to control its function as a function of the at least one pressure value.

5. The device as recited in claim 1, wherein the at least one pressure value is an absolute pressure value or a differential pressure value.

6. The device as recited in claim 1, wherein the at least one vehicle system is an injection system, wherein the at least one vehicle system is configured to use the at least one pressure value for plausibility checking, wherein the at least one vehicle system is configured to control its function as a function of the at least one pressure value, and wherein the at least one pressure value is an absolute pressure value or a differential pressure value.

* * * * *